Patented May 13, 1924.

1,493,945

UNITED STATES PATENT OFFICE.

RICHARD WOLFFENSTEIN, OF BERLIN-GRUNEWALD, GERMANY.

METHOD OF PRODUCING ALUMINUM FORMATE.

No Drawing.   Application filed August 23, 1920.   Serial No. 405,317.

*To all whom it may concern:*

Be it known that I, RICHARD WOLFFENSTEIN, a citizen of the German Republic, and a resident of Berlin-Grunewald, Germany, have invented certain new and useful Improvements in a method of producing Aluminum Formate, of which the following is a specification.

It has been proposed, to produce aluminum formate by the action of formate of sodium upon aluminum-sulphate in such a manner that the sulphate of sodium, formed by the reaction, is separated. This process however, which must emanate from concentrated solutions, is very tiresome, furthermore it requires the maintenance of certain low temperatures and finally it necessitates a special apparatus.

It has now been ascertained that these drawbacks can be obviated by causing formate of sodium and aluminum salts to act upon each other in such a diluted solution that neither the components nor the products of conversion can be precipitated. The presence of sulphate of sodium is in various respects, especially in pharmacological regard, of importance in such a process.

It has even been possible, when operating in the indicated manner, to utilize difficultly soluble alum for the reaction in a profitable manner.

When the production of the solutions is not to be left to the manufacturer, but to the consumer in order to save thereby on bottles, packing material, freight-expenses and the like for the liquid to be carried along, according to the present invention a solid preparation can be furnished to the consumer.

For this purpose a desiccated aluminum-salt, the acid component of which is stronger than formic acid, is mixed together with formate of sodium in molecular proportions.

The desiccation of the materials, which desiccation need not be a complete one, is suitably effected by heating said materials in a vacuum. The desiccation is necessary in order to obtain a durable, clear product, which remains soluble in water.

It was not to be expected that the desiccation could be of importance for making the product durable, as the basic components, as alum or aluminum-sulphate and formate of sodium, are chemical compounds of such a character that they do not undergo any changes when being stored, even when they are not desiccated. It was further to be assumed that the formate of sodium, which can bind several molecules of water, would have prevented from the beginning any irregularities which could have resulted from the separation of the water from the aluminum-salt.

Nevertheless it has been ascertained that nondesiccated materials do not result in a product which is soluble in water and durable for a period of time.

If the product obtained in the described manner is mixed with water, a clear solution of formate of aluminum results, the concentration of which the consumer can determine in accordance with the purpose for which the solution is to be used.

Having thus particularly described the nature of my invention, what I claim as new and desire to secure by Letters Patent of the United States is:

As a new article of manufacture a mixture of molecular quantities of a desiccated alkali metal formate and of a partially dehydrated aluminum salt having a stronger acid component than formic acid, this product resulting when mixed with water, in a clear solution of aluminum formate, containing alkali-metal sulphate.

In testimony whereof I affix my signature.

RICHARD WOLFFENSTEIN.